United States Patent [19]
Howard

[11] Patent Number: 5,906,507
[45] Date of Patent: May 25, 1999

[54] FOLDABLE ELECTRICAL CORD

[76] Inventor: James R. Howard, 4300 Dover, Independence, Mo. 64055-4834

[21] Appl. No.: 08/910,962

[22] Filed: Aug. 7, 1997

[51] Int. Cl.$^6$ .................................................... H01R 13/72
[52] U.S. Cl. ........................................... 439/501; 174/135
[58] Field of Search ................................... 439/501, 502; 174/135, 136

[56] References Cited

U.S. PATENT DOCUMENTS

| | | |
|---|---|---|
| 3,068,316 | 12/1962 | Witt . |
| 3,197,830 | 8/1965 | Hoadley . |
| 3,290,453 | 12/1966 | Jensen . |
| 3,390,680 | 7/1968 | Marcum . |
| 3,520,988 | 7/1970 | Ballock, Sr. . |
| 3,538,484 | 11/1970 | Passafiume . |
| 4,667,460 | 5/1987 | Kramer . |
| 4,815,172 | 3/1989 | Ward . |
| 4,991,265 | 2/1991 | Campbell et al. . |
| 5,027,478 | 7/1991 | Suhr . |
| 5,075,934 | 12/1991 | Osedo . |
| 5,142,743 | 9/1992 | Hahn . |
| 5,168,128 | 12/1992 | Thomsen . |
| 5,175,398 | 12/1992 | Hofmann . |
| 5,309,604 | 5/1994 | Poulsen . |

*Primary Examiner*—Gary F. Paumen
*Attorney, Agent, or Firm*—Hovey, Williams, Timmons & Collins

[57] ABSTRACT

A foldable electrical cord assembly (10) that can be quickly and easily folded or unfolded to any length is disclosed. The electrical cord assembly includes an elongated electrical cord (12) having a plug end (14) and an opposed device end (18) and a plurality of alternating sections of hook and loop fastening material (20,22) attached to and spaced along the length of the cord between the plug end and the device end for permitting selective folding of portions of the cord. The cord can be folded between the sections of the fastening material so that adjacent sections of the hook and loop fastening material are interlocked to maintain the cord in its folded position. When it is desired to extend additional length of the cord, a selected number of the sections of the fastening material can be separated to unfold a desired length of the cord.

4 Claims, 1 Drawing Sheet

FOLDABLE ELECTRICAL CORD

BACKGROUND OF THE INVENTION

1. Field of the Invention

The present invention relates to electrical cords, and more particularly to electrical cords that can be selectively folded and unfolded to take up any excess length in the cords.

2. Description of the Prior Art

Appliances and other electrical devices such as hair dryers, mixers, irons, and lamps typically have long electrical cords that permit them to be plugged into distant outlets. Unfortunately, the excess length of the cords often becomes tangled during use and storage or is coiled on a floor or counter top in an unsightly and possibly unsafe manner.

To solve the above-described problems, many people fold and tie the excess lengths of electrical cords together with fastening devices such as twine, rubber bands, wire or other items. Although this solution eliminates excess length in the cords, it does not permit portions of the cord to be selectively folded or unfolded without first completely removing the fastening device from the cord. Moreover, once the cords are unfolded, the fastening devices are often misplaced or lost.

OBJECTS AND SUMMARY OF THE INVENTION

In view of the foregoing, it is an object of the present invention to provide an improved device for taking up the excess length of an electrical cord that overcomes the limitations described above.

It is a more particular object of the present invention to provide a foldable electrical cord with structure that permits portions of the cord to be selectively folded and unfolded to take up the excess length of the cord or to feed out additional length of the cord without folding or unfolding the entire cord.

The present invention achieves these objects and other objects that become evident from the following description of the preferred embodiments of the present invention by providing a foldable electrical cord assembly broadly including an elongated electrical cord and a plurality of sections of fastening material attached to and spaced along the length of the cord for permitting selective folding and unfolding of portions of the cord. In preferred forms, the sections of fastening material include a plurality of alternating sections of hook and loop fastening material spaced along the length of the cord.

In use, the cord can be folded over itself between the sections of fastening material so that adjacent sections of the hook and loop fastening material are interlocked to maintain the cord in its folded position. When it is desired to extend additional length of the cord, a selected number of sections of fastening material can be separated to unfold a desired length of the cord. Conversely, when it is desired to take up a selected amount of excess length of the cord, a selected number of adjacent sections of fastening material can be interlocked to refold a desired length of the cord. With this configuration, the length of the electrical cord can be quickly and simply customized for a particular use.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
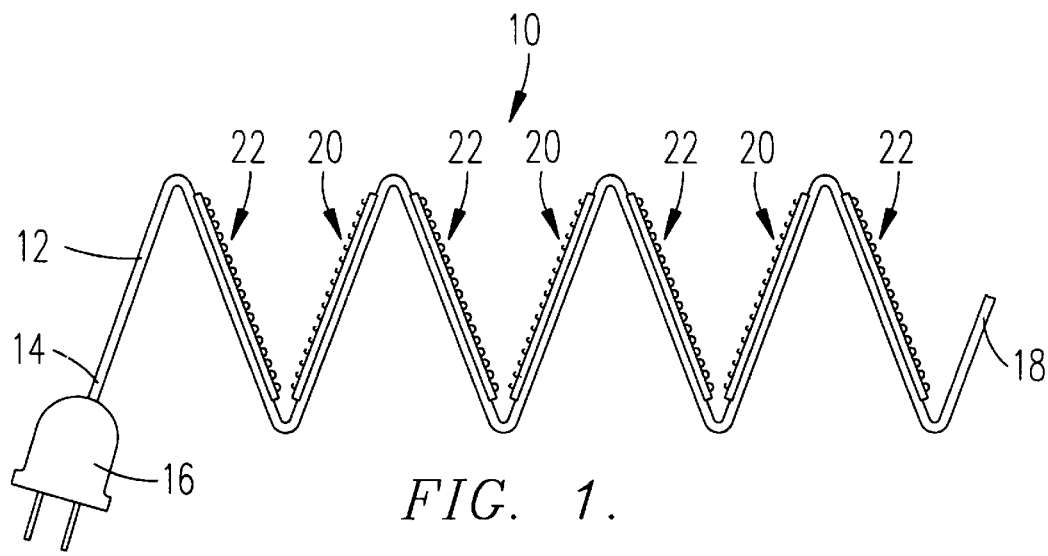
FIG. 1 is an elevational view of a foldable electrical cord assembly constructed in accordance with a preferred embodiment of the present invention showing the cord in its unfolded state.
Figure 2:
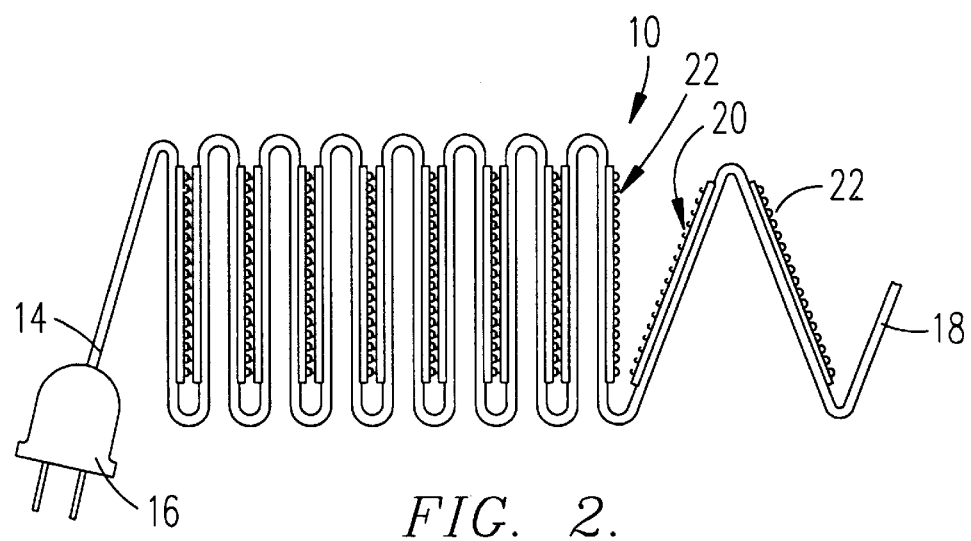
FIG. 2 is an elevational view of the foldable electrical cord assembly showing the cord partially folded.

The drawing figures illustrate a foldable electrical cord assembly 10 constructed in accordance with a preferred embodiment of the invention. As best illustrated in FIGS. 1 and 2, the electrical cord assembly 10 broadly includes an elongated electrical cord 12 and a plurality of sections of fastening material attached to and spaced along the length of the cord for permitting selective folding and unfolding of portions of the cord to selectively take up excess length or let out additional length of the cord.

In more detail, the cord 12 is conventional and includes a plurality of elongated wire conductors formed of copper or other conductive material covered by an outer, insulative housing formed of enamel, rubber, plastic, or other insulative material.

The cord 12 includes a plug end 14 having an electrical plug 16 attached thereto and a device end 18 for connection to an electrical device such as a hair dryer, mixer, iron, lamp, etc. The cord may be of any desired length and may be designed to conduct any voltage and current depending upon its application.

Figure 3:
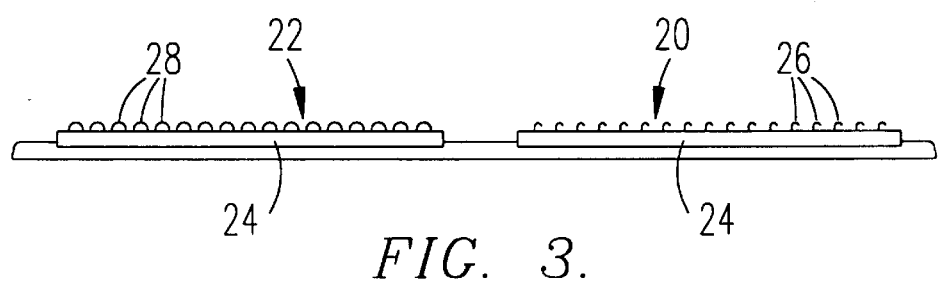
FIG. 3 is a side view of a portion of the electrical cord assembly showing the fasteners in more detail.
Figure 4:
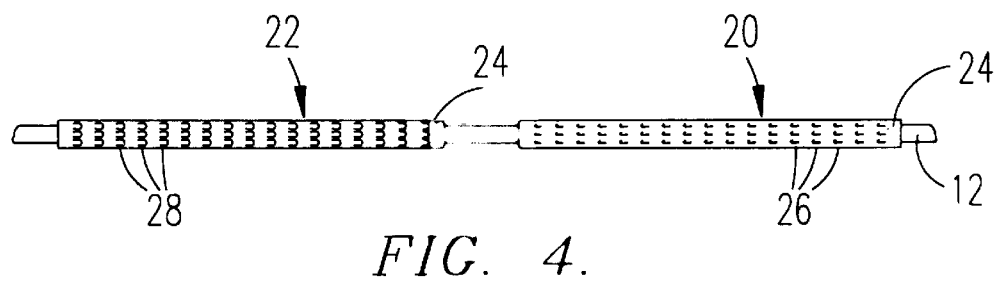
FIG. 4 is a top view of the portion of the electrical cord shown of FIG. 3.

The sections of fastening material preferably include a plurality of alternating sections of hook fastening material 20 and loop fastening material 22 spaced along the length of the cord. As best illustrated in FIGS. 3 and 4, each section includes a flexible base or substrate 24 formed of cloth or other flexible material and a plurality of rows and columns of hooks 26 or loops 28 formed of thin wire or other material extending therefrom.

The hook and loop sections 20,22 are each preferably approximately 1–2" in length and $\frac{1}{16}$–$\frac{1}{8}$" in width and are preferably spaced approximately $\frac{1}{4}$–$\frac{1}{2}$" apart. The sections are preferably permanently bonded to the cord 12 with adhesives during manufacture of the electrical cord assembly 10. Alternately, the sections may be provided separately on self-adhesive backing material so that they may be attached to existing electrical cords to create foldable electrical cords.

In use, the electrical cord assembly 10 can be selectively folded and unfolded to any desired length. For example, when it is desired to completely fold the cord assembly 10 for storage, the cord 12 can be folded over itself between the sections of fastening material 20,22 so that adjacent sections of the hook and loop fastening material are interlocked as illustrated in FIG. 2. The adjacent sections of hook and loop fastening material interlock with a force sufficient to maintain the cord in its folded position.

When it is desired to extend additional length of the cord 12, a selected number of the sections of fastening material 20,22 can be separated to unfold a desired length of the cord. Conversely, when it is desired to take up a selected amount of excess length of the cord, a selected number of adjacent sections of fastening material can be urged together and interlocked to refold a desired length of the cord. With this configuration, the length of the electrical cord can be quickly and simply customized for a particular use.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A foldable electrical cord assembly comprising:

an elongated electrical cord having a plug end and an opposed device end; and a plurality of sections of fastening material attached to and spaced along the length of the cord between the plug end and the device end, wherein the cord can be folded between the sections of fastening material and adjacent sections of the fastening material can engage each other to maintain the cord in its folded position and then be separated to unfold the cord for permitting selective folding and unfolding of portions of the cord.

2. The assembly as set forth in claim 1, the sections of fastening material comprising at least one section of hook fastening material attached to the cord and at least one section of loop fastening material attached to the cord and spaced from the hook fastening material along the length of the cord, wherein the cord can be folded between the sections of hook and loop fastening material and the sections of hook and loop fastening material can be interlocked with one another to maintain the cord in its folded position.

3. The assembly as set forth in claim 2, the sections of fastening material comprising a plurality of alternating sections of the hook and loop fastening material spaced along the length of the cord.

4. A foldable electrical cord assembly comprising:

an elongated electrical cord having a plug end and an opposed device end; and a plurality of alternating sections of hook and loop fastening material attached to and spaced along the length of the cord between the plug end and the device end, wherein the cord can be folded between the sections of hook and loop fastening material and adjacent sections of the hook and loop fastening material can be interlocked to maintain the cord in its folded position and then separated to unfold the cord for permitting selective folding and unfolding of portions of the cord.

* * * * *